(12) United States Patent
Crook

(10) Patent No.: US 7,158,876 B2
(45) Date of Patent: Jan. 2, 2007

(54) AUTOMATED VEHICLE ROUTING BASED ON PHYSICAL VEHICLE CRITERIA

(75) Inventor: Hubert W. Crook, Jackson, MS (US)

(73) Assignee: Hubert W. Crook Computer Consultants, Inc., Jackson, MS (US)

( * ) Notice: Subject to any disclaimer, the term of this patent is extended or adjusted under 35 U.S.C. 154(b) by 157 days.

(21) Appl. No.: 10/917,331

(22) Filed: Aug. 13, 2004

(65) Prior Publication Data

US 2006/0036363 A1 Feb. 16, 2006

(51) Int. Cl.
G01C 21/34 (2006.01)

(52) U.S. Cl. ....................................... 701/201; 701/209

(58) Field of Classification Search ................ None
See application file for complete search history.

(56) References Cited

U.S. PATENT DOCUMENTS

| | | | |
|---|---|---|---|
| 3,940,830 A | 3/1976 | Anderson et al. |
| 5,452,212 A | 9/1995 | Yokoyama et al. |
| 5,559,707 A | 9/1996 | DeLorme et al. |
| 5,694,322 A | 12/1997 | Westerlage et al. |
| 5,893,081 A | 4/1999 | Poppen |
| 5,893,898 A | 4/1999 | Tanimoto |
| 5,970,481 A | 10/1999 | Westerlage et al. |
| 5,991,689 A | 11/1999 | Aito et al. |
| 6,249,742 B1 | 6/2001 | Friederich et al. |
| 6,278,935 B1 | 8/2001 | Kaplan et al. |
| 6,356,836 B1 | 3/2002 | Adolph |
| 6,415,226 B1 | 7/2002 | Kozak |
| 6,459,986 B1 | 10/2002 | Boyce et al. |
| 6,463,384 B1 | 10/2002 | Kaplan et al. |
| 6,473,770 B1 | 10/2002 | Livshutz et al. |
| 6,487,497 B1 | 11/2002 | Khavakh et al. |
| 6,496,774 B1 | 12/2002 | Davies |
| 6,507,850 B1 | 1/2003 | Livshutz et al. |
| 6,526,348 B1 | 2/2003 | McDonough |
| 6,526,349 B1 | 2/2003 | Bullock et al. |
| 6,567,743 B1 | 5/2003 | Mueller et al. |
| 6,615,133 B1 | 9/2003 | Boies et al. |

(Continued)

FOREIGN PATENT DOCUMENTS

WO WO 93/05492 3/1993

(Continued)

OTHER PUBLICATIONS

Commercial Vehicle Operations (CVO) Advanced Traveler Information Systems (ATIS), Summary of National Practice, Final Report, Jun. 2003, Prepared for Minnesota Department of Transportation, Submitted by TranSmart Technologies, Inc.

(Continued)

Primary Examiner—Michael J. Zanelli
(74) Attorney, Agent, or Firm—Banner & Witcoff, Ltd.

(57) ABSTRACT

A system, method, and user interface are provided for determining a traversable route for a vehicle, which supports the ability to determine traversable routes based on physical vehicle criteria and vehicle criteria limits imposed by the routes. The user enters the vehicle criteria, and in response the system populates a set of origins based on the vehicle criteria. The user then selects an origin from this list, which causes the system to calculate a set of destinations based on the selected origin and vehicle criteria. The user then selects a destination from that list, which causes the system to select a set of routes connecting the user-selected origin to the user-selected destination. This list of routes may be sorted alphabetically by route and/or by route distance. The user then selects a route.

21 Claims, 14 Drawing Sheets

U.S. PATENT DOCUMENTS

| | | |
|---|---|---|
| 6,622,087 B1 | 9/2003 | Anderson |
| 6,633,812 B1 | 10/2003 | Martin et al. |
| 2001/0047241 A1 | 11/2001 | Khavakh et al. |
| 2003/0045996 A1 | 3/2003 | Yamazaki et al. |
| 2003/0144794 A1 | 7/2003 | Schuessler |
| 2003/0158657 A1 | 8/2003 | Agnew et al. |
| 2003/0158658 A1 | 8/2003 | Hoever et al. |
| 2003/0163333 A1 | 8/2003 | Podgurny et al. |
| 2003/0182052 A1 | 9/2003 | Delorme et al. |

FOREIGN PATENT DOCUMENTS

| | | |
|---|---|---|
| WO | WO 02/35477 A1 | 5/2002 |
| WO | WO 03/063089 A2 | 7/2003 |

OTHER PUBLICATIONS

Web Service, http://www.trafficonline.com/webservice.htm, date of first availability and/or disclosure prior to (or believed to be prior to) application filing date.

Fleetonline, http://www.trafficonline.com/fleetonline.htm, date of first availability and/or disclosure prior to (or believed to be prior to) application filing date.

TrafficCast—the Power of Prediction, http://www.trafficcast.com/index.html, date of first availability and/or disclosure prior to (or believed to be prior to) application filing date.

Faster Route Permitting for Oversize/Overweight Vehicles, The Wisconsin Department of Transportation, Research Development and Technology Transfer, May 2002.

An Improved Truck Routing Process, Kansas DOT"Truck Routing Information System, Mar. 18, 2003.

Spatial Information Times, vol. 2, Issue 4, Oct. 2002.

Declaration by Hubert W. Crook, Executed Oct. 22, 2004.

Oversize/Overweight Routing System

200 — View Available Routes

201 — Enter Account Number [ ]   Enter Password [ ]   [Login]

Please Read Instructions and Restrictions First!

- To establish an account, please contact <Service Entity>.
- 202 — <u>Account Management</u> Review purchased permits and manage account settings.

Oversize/Overweight Routing System

| Issue To: | | Bill To: | |
|---|---|---|---|
| Account Number | 013174 | Account Number | 013174 |
| Company Name | TEST COMPANY | Company Name | TEST COMPANY |
| Address | 1234 ANYWHERE ST | Address | 1234 ANYWHERE ST |
| City, State, Zip | TEST, MS 3900000000 | City, State, Zip | TEST, MS 3900000000 |
| Insuror | TEST INSURANCE COMPANY | | |
| Multico | | | |
| Expiration Date | 10/01/2005 | | |
| Cancel Date | | | |
| Permit Type | Select a Permit Type | | |

Oversize/Overweight Routing System

| Issue To: | | Bill To: | |
|---|---|---|---|
| Account Number | 013174 | Account Number | 013174 |
| Company Name | TEST COMPANY | Company Name | TEST COMPANY |
| Address | 1234 ANYWHERE ST | Address | 1234 ANYWHERE ST |
| City, State, Zip | TEST, MS 3900000000 | City, State, Zip | TEST, MS 3900000000 |
| Insuror | TEST INSURANCE COMPANY | | |
| Multico | | | |
| Expiration Date | 10/01/2005 | | |
| Cancel Date | | | |
| Permit Type | Oversize/Overweight | | |
| Load Size | Feet | Inches | Truck Weight | Pounds |
| Height | | | Gross | |
| Width | | | Axle Group 1 | |
| Length | | | Axle Group 2 | |
| Front Overhang | | | Axle Group 3 | |
| Rear Overhang | | | Axle Group 4... | |

401 — Permit Type / Load Size
402 — (left column)
403 — (right column)
404 — Find Available Routes

FIG. 7

Oversize/Overweight Routing System

| Issue To: | | Bill To: | |
|---|---|---|---|
| Account Number | 013174 | Account Number | 013174 |
| Company Name | TEST COMPANY | Company Name | TEST COMPANY |
| Address | 1234 ANYWHERE ST | Address | 1234 ANYWHERE ST |
| City, State, Zip | TEST, MS 3900000000 | City, State, Zip | TEST, MS 3900000000 |
| Insuror | TEST INSURANCE COMPANY | | |
| Multico | | | |
| Expiration Date | 10/01/2005 | | |
| Cancel Date | | | |
| Permit Type | Oversize/Overweight | | |
| Load Size | Feet | Inches | Truck Weight | Pounds |
| Height | 14 | 9 | Gross | 125,000 |
| Width | 12 | 0 | Axle Group 1 | |
| Length | 75 | 6 | Axle Group 2 | |
| Front Overhang | 0 | 0 | Axle Group 3 | |
| Rear Overhang | 0 | 0 | Axle Group 4... | |

Route Origin
Select Route Origin

ABERDEEN, MS
ACKERMAN, MS
ALABAMA
AMORY, MS
ARCOLA, MS
ARKANSAS
ASHLAND, MS
ASKEW, MS
BALDWYN, MS
BANKS, MS
BASSFIELD, MS
BATESVILLE, MS
BATESVILLE (WEST OF I-55), MS
.
JACKSON, MS

FIG. 8

Oversize/Overweight Routing System

| Issue To: | | Bill To: | |
|---|---|---|---|
| Account Number | 013174 | Account Number | 013174 |
| Company Name | TEST COMPANY | Company Name | TEST COMPANY |
| Address | 1234 ANYWHERE ST | Address | 1234 ANYWHERE ST |
| City, State, Zip | TEST, MS 3900000000 | City, State, Zip | TEST, MS 3900000000 |
| Insuror | TEST INSURANCE COMPANY | | |
| Multico | | | |
| Expiration Date | 10/01/2005 | | |
| Cancel Date | | | |
| Permit Type | Oversize/Overweight | | |

| Load Size | Feet | Inches | Truck Weight | Pounds |
|---|---|---|---|---|
| Height | 14 | 9 | Gross | 125,000 |
| Width | 12 | 0 | Axle Group 1 | |
| Length | 75 | 6 | Axle Group 2 | |
| Front Overhang | 0 | 0 | Axle Group 3 | |
| Rear Overhang | 0 | 0 | Axle Group 4... | |

| Route Origin | Route Destination |
|---|---|
| JACKSON, MS | Select Route Destination |
| | ALABAMA |
| | BATESVILLE, MS |
| | BOLTON, MS |
| | BRANDON, MS |
| | CANTON, MS |
| | CARTHAGE, MS |
| | CARLISLE, MS |
| | COLUMBIA, MS |
| | FLORA, MS |
| | FLORA, MS (AT XYZ LOCATION) |
| | FLOWOOD, MS |

Oversize/Overweight Routing System

| Issue To: | | Bill To: | |
|---|---|---|---|
| Account Number | 013174 | Account Number | 013174 |
| Company Name | TEST COMPANY | Company Name | TEST COMPANY |
| Address | 1234 ANYWHERE ST | Address | 1234 ANYWHERE ST |
| City, State, Zip | TEST, MS 3900000000 | City, State, Zip | TEST, MS 3900000000 |
| Insuror | TEST INSURANCE COMPANY | | |
| Multico | | | |
| Expiration Date | 10/01/2005 | | |
| Cancel Date | | | |
| Permit Type | Oversize/Overweight | | |
| Load Size | Feet | Inches | Truck Weight | Pounds |
| Height | 14 | 9 | Gross | 125,000 |
| Width | 12 | 0 | Axle Group 1 | |
| Length | 75 | 6 | Axle Group 2 | |
| Front Overhang | 0 | 0 | Axle Group 3 | |
| Rear Overhang | 0 | 0 | Axle Group 4... | |
| Origin | Destination | Route | |
| JACKSON, MS | TENNESSEE, (BORDER) | Select Route | |

701, 702, 703

Route dropdown:
- 49 I-20 I-220 I-55 - Distance: 206 Miles
- I-20 I-55 302 72 - Distance: 212 Miles
- 18 I-20 I-220 49 49E 12 I-55 - Distance: 229 Miles

FIG. 10

FIG. 11 Oversize/Overweight Routing System

| Issue To: | | | Bill To: | |
|---|---|---|---|---|
| Account Number | 013174 | | Account Number | 013174 |
| Company Name | TEST COMPANY | | Company Name | TEST COMPANY |
| Address | 1234 ANYWHERE ST | | Address | 1234 ANYWHERE ST |
| City, State, Zip | TEST, MS 3900000000 | | City, State, Zip | TEST, MS 3900000000 |
| Insuror | TEST INSURANCE COMPANY | | | |
| Multico | | | | |
| Expiration Date | 10/01/2005 | | | |
| Cancel Date | | | | |
| Permit Type | Oversize/Overweight | | | |

| Load Size | Feet | Inches | Truck Weight | Pounds |
|---|---|---|---|---|
| Height | 14 | 9 | Gross | 125,000 |
| Width | 12 | 0 | Axle Group 1 | |
| Length | 75 | 6 | Axle Group 2 | |
| Front Overhang | 0 | 0 | Axle Group 3 | |
| Rear Overhang | 0 | 0 | Axle Group 4... | |

| Origin | Destination | Route | Distance |
|---|---|---|---|
| 801 — JACKSON | TENNESSEE | 49 I-20 I-220 I-55 | 206 Miles |

| Travel Start Date/Time | | Travel End Date |
|---|---|---|
| 802 — 08/05/2004 | 15:00 | 08/07/2004 — Note: Travel start date must be between 08/05/2004 and 08/12/2004 — |

| Truck Make | Truck Tag | Tag State | Load Description |
|---|---|---|---|
| 803 — PETERBUILT | A8012345 | MISSISSIPPI | TURBINE ASSEMBLY |

Travel Restrictions
804 — ***BYPASS LOW STRUCTURES* *BYPASS LOW WEIGHT AND POSTED BRIDGES***

Remarks

| | | | | |
|---|---|---|---|---|
| 805 — Permit Cost | 45000 Pounds over legal x 206 miles x 5 cents per mile per 1000lbs = $ 463.50 | | Overweight Subtotal | $ 463.50 — 806 |
| | 1) Carefully verify all permit information. | | Oversize Subtotal | $ 10.00 — 807 |
| | 2) Click "Purchase Pemit Now" to buy this permit | | Trip Subtotal | $ 0.00 — 808 |
| | 3) The next screen will be your actual permit to be printed. | Purchase Permit Now | Total Cost | $ 473.50 — 809 |

810

1001 — Issue To: / 1002 — Commercial Vehicle Travel Permit / Oversize/Overweight - Permit # W118292

| Commercial Vehicle Travel Permit Oversize/Overweight - Permit # W118292 ||||
|---|---|---|---|
| Issue To: || Bill To: ||
| Account Number | 013174 | Account Number | 013174 |
| Company Name | TEST COMPANY | Company Name | TEST COMPANY |
| Address | 1234 ANYWHERE ST | Address | 1234 ANYWHERE ST |
| City, State, Zip | TEST, MS 3900000000 | City, State, Zip | TEST, MS 3900000000 |
| Insuror | TEST INSURANCE COMPANY | | |
| Expiration Date | 10/01/05 | | |

| Truck Size | Feet | Inches | Gross Weight (Lbs) |
|---|---|---|---|
| Height | 14 | 6 | 125000 |
| Width | 12 | 0 | |
| Length | 75 | 6 | |
| Front Overhang | 0 | 0 | |
| Rear Overhang | 0 | 0 | |

| Origin | Destination | Route | Distance |
|---|---|---|---|
| JACKSON, MS | TENNESSEE (BORDER) | 49 I-20 I-220 I-55 | 206 Miles |

| Travel Start Date/Time | 08/05/04 15:00 | Travel End Date | 08/07/04 |
|---|---|---|---|

| Truck Make | Tag Number | Tag State | Load Description |
|---|---|---|---|
| PB | A8012345 | MS | TURBINE ASSEMBLY |

Travel Restrictions - T6969** *BYPASS LOW STRUCTURES* *BYPASS LOW WEIGHT AND POSTED BRIDGES***

| Permit Cost | 45000 Pounds over legal x 206 miles x 5 cents per mile per 1000lbs = $ 463.50 | Overweight Subtotal | $ 463.50 |
|---|---|---|---|
| Remarks | | Oversize Subtotal | $ 10.00 |
| | | Trip Subtotal | $ 0.00 |
| **This is your actual permit. It is valid for ONE TRIP within the specified dates. **Print this permit and keep it in the cab of your commercial vehicle while traveling.- T6969 | | Total Permit Cost | $ 473.50 |

AUTOMATED VEHICLE ROUTING BASED ON PHYSICAL VEHICLE CRITERIA

FIELD OF THE INVENTION

Aspects of the present invention relate generally to enabling a user to obtain, over a computer network, validation of safe travel with a vehicle from an origin to a destination along a specific route, taking into consideration physical criteria of the vehicle itself.

BACKGROUND

Certain authorities, such as state highway administrations, require that certain vehicles such as oversized or overweight trucks obtain a permit to travel within their jurisdictions. In determining whether such a vehicle should be granted a permit for a given requested route, the authorities implement a largely manual process that requires routing technicians to study the physical characteristics of the vehicle being permitted and then manually determine whether the vehicle in question is acceptable for the requested route. The technicians must also compute permit fees, in accordance with state regulations, that are based on physical vehicle characteristics and registration aspects of the vehicle being permitted, and the distance of the requested route.

This manual routing process is therefore time-consuming and prone to human error. Moreover, a staff of routing technicians together must repeat this permitting process over and over, often for the same routes, in connection with many different vehicles. Such a process has thus always been extremely inefficient and costly.

To aid the technicians and the users requesting the permits, systems having access to a large database of route segments in the form of a base map have been developed. This data may be displayed in the form of a graphical map allowing a travel origin and destination to be selected, with the software determining the best route(s) based certain criteria.

However, such base map routing systems have shortcomings. For example, multiple route segments must be exhaustively combined to determine a single traversable route.

In addition, such systems require a complete database of roads and all related route information to operate properly and accurately. Such complete information is often either not available or subject to change. Conventional routing systems do not typically account for the characteristics of the vehicle that will be traversing a route. Conventional routing systems also do not account for the frequency of use of routes in making routing decisions.

BRIEF SUMMARY OF THE INVENTION

Aspects of the present invention are directed to a routing method and system using a stored database of routes. Each route defines an origin, a destination, and at least one vehicle criterion limit that can be used to determine which types of vehicles are allowable on the respective routes. For example, vehicle criterion limits may include, but are not limited to, maximum vehicle height, maximum vehicle width, maximum vehicle length, maximum front and/or rear overhang of the vehicle, maximum gross weight, and/or axle and/or axle group weight(s) allowable along the entire route.

Further aspects of the present invention are directed to a user interface that assists the user in determining a traversable route for a vehicle. Traversable routes may be selected based on physical vehicle criteria and vehicle criteria limits imposed by the routes. The user interface first enables the user to enter physical information about the vehicle, also known as vehicle criteria. In response, the system populates a set of origins based on the vehicle criteria. The user then selects an origin from this list, which causes the system to calculate a set of destinations based on the selected origin and vehicle criteria. The user then selects a destination from that list, which causes the system to select a set of routes connecting the user-selected origin to the user-selected destination. This list of routes may be sorted alphabetically by route and/or by route distance. The user then selects a route.

According to a further aspect of the present invention, the database may be organized as a plurality of route "templates" that each defines one or more static routes that completely connect an origin with a destination. For example, a route template might define one or more routes connecting city A with city B. Thus, it is not necessary to "string together" a plurality of routes to form a route between city A and city B; such a route (or routes) will already have been pre-defined and stored in the route templates in the database. It should be noted that a route may be defined even though it includes multiple different roadways linked together in series.

Still further aspects of the present invention are directed to determining a route based on the frequency of use of the route. When a list of possible routes is presented to a user, the routes may be presented in order from most frequently used to least frequently used, or the list may even be filtered to exclude routes that are not sufficiently frequently used. Routes may be further listed in and order in accordance with their route lengths (e.g., listed in order starting with the shortest routes).

These and other aspects of the invention will become apparent to one of ordinary skill in the art upon a reading of the following description, drawings, and the claims.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

FIGS. 5–12 are illustrative screen shots for a user interface, in accordance with at least one aspect of the present invention.

FIG. 13 is an illustrative screen shot of a transmittable and/or printable permit certificate and permit identifier, in accordance with at least one aspect of the present invention.

DETAILED DESCRIPTION OF ILLUSTRATIVE EMBODIMENTS

Figure 1:
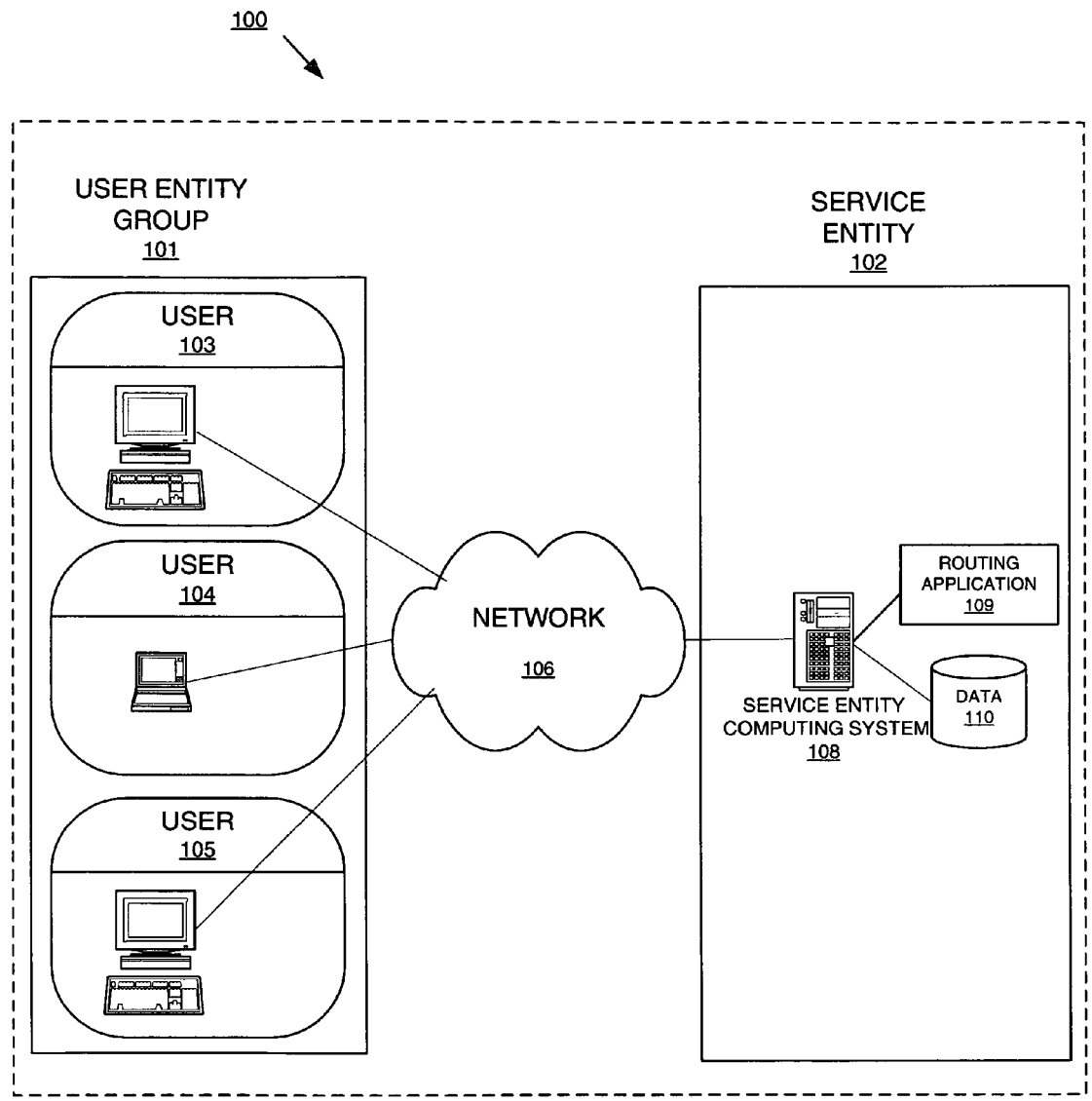
FIG. 1 is a functional block diagram of an illustrative vehicle routing and permitting system, in accordance with at least one aspect of the present invention.

Referring to FIG. 1, an illustrative embodiment of an electronic vehicle routing and permitting system 100 is shown. The system 100 ultimately provides for credential verification and direct purchase of a travel certificate validating the travel of a vehicle, also known as a permit. The term "vehicle" as used herein is broadly construed to include any type of vehicle such as a commercial truck, as well as a private passenger car or truck. As shown, the system 100 includes a user entity group 101 and a service entity 102. For the purposes of this disclosure, the term "service entity" should be broadly construed to include any type of private or public service provider, such as but not limited to a commercial service provider or an officially authorized state or other government agency. The user entity group 101 includes one or more user entity computing units 103, 104 and 105. A service entity 102 includes one or more service entity computing system(s) 108. The service entity computing system 108 and the user entity computing units 103–105 are inter-coupled through a network 106. The network 106 may be any data communication network, such as but not limited to a private network, a public network, a local area network (LAN), a wide area network (WAN), a virtual private network (VPN), an intranet, a wired and/or wireless network, a landline or wireless telephone network, and/or the Internet.

The computing units 103–105 may be any type of computing and/or communication devices, such as but not limited to personal computers, laptops, notebook computers, hand-held computers such as personal digital assistants (PDAs), television set top boxes, and/or cellular telephones. The computing units 103–105 may be inter-coupled with one another over an additional network (such as an intranet) separate from the network 106, or they may be stand-alone computing units coupled only to the network 106. The coupling of the computing units 103–105 may be a permanent connection (e.g., an "always-on" cable modem connection or direct Internet backbone connection) through a server at the premises of the user entity group 101 or only on an as-needed basis (e.g., using a dial-up telephonic modem connection). It will be readily appreciated that the user entity group 101 may include less or more than three computing units, and indeed may have only a single user entity computing unit. In addition, the user entity group 101 may include multiple related users at the same location or many locations (e.g., a corporate grouping of employees), or multiple unrelated users at one or more locations.

The service entity computing system 108 may further include a routing software application 109 (e.g., executed by the service entity computing system 108) and/or a storage device 110 that may include a database of route information. The service entity computing system 108 may further execute software that facilitates and/or implements communications and transactions between the user entity group 101 and the service entity 102.

Figure 3:
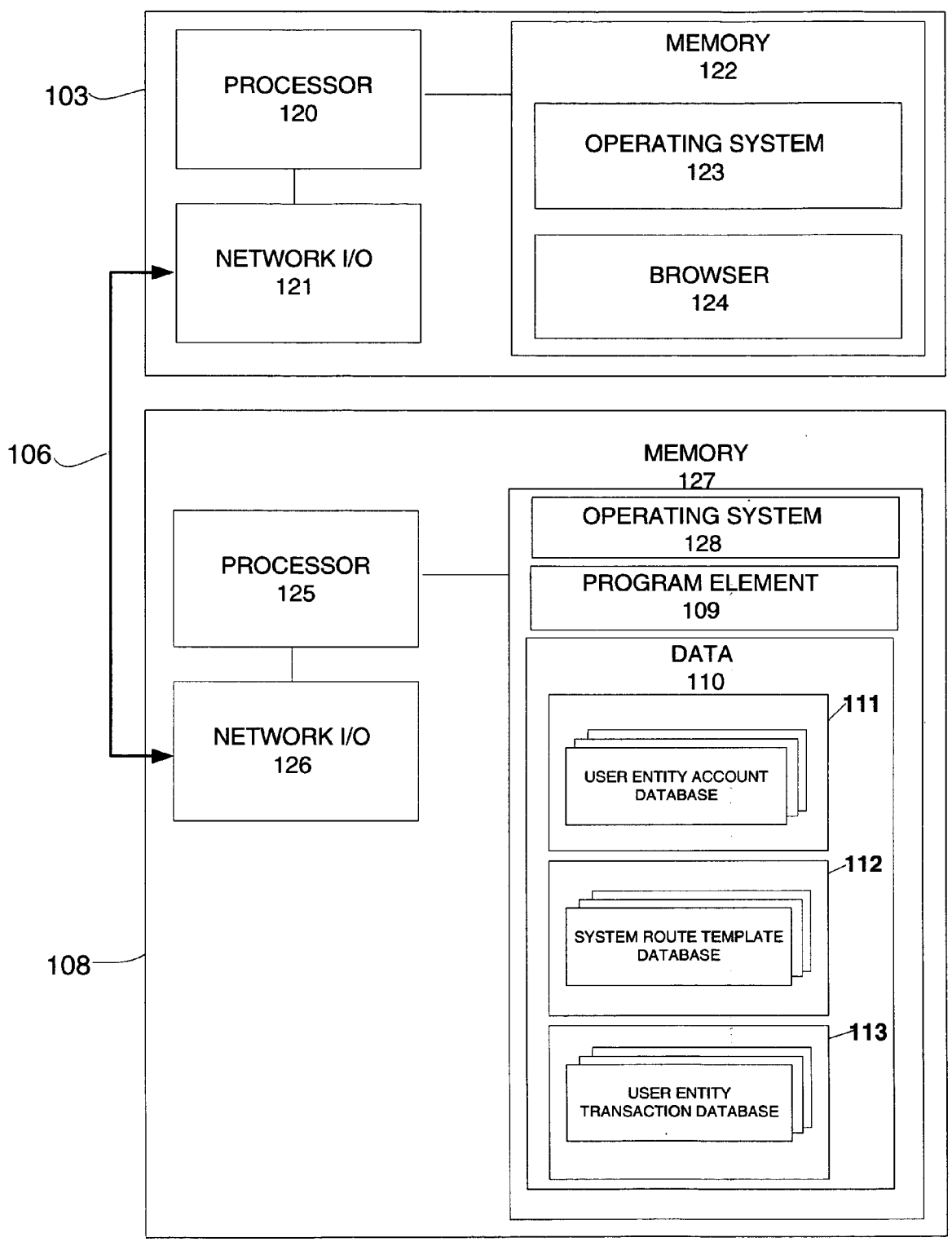
FIG. 3 is a functional block diagram of an illustrative routing server and database system in accordance with at least one aspect of the present invention.

FIG. 3 depicts an illustrative functional block diagram showing the coupling of the user entity computing unit 103 and the service entity computing system 108 via the network 106. The structure and functionality of user entity units 104 and 105 may be identical to that of user entity computing unit 103 and as such will not be further described herein. As shown, user entity computing unit 103 has a processor 120, a memory 122, and a network input/output (I/O) interface 121 for accessing the network 106. The network I/O interface 121 may be implemented, for example, as a dial-up modem or as a permanent network connection. The processor 120, which may be a central processing unit (CPU) or any other processor, may be adapted to execute computer-executable software program instructions stored in a memory 122 or other computer-readable medium. For example, the user entity computing unit 103 may execute an operating system 123 that supports multiple applications. The operating system 123 may be any type of operating system, such as but not limited to a multitasking operating system that allows simultaneous execution of multiple applications in a graphical windowing environment. The memory 122 may further store a browser application program 124 (such as a conventional Internet browser application, e.g., Microsoft INTERNET EXPLORER brand browser) that is executable by the processor 120. As will be discussed further, information provided by the system 100, such as a series of routes between an origin location and a destination location, may be displayed onto a display device using the browser 124. The user entity computing unit 103 may further include e-mail software components (not shown) as well as additional hardware and software components and modules as desired.

The service entity computing system 108 includes one or more computer servers and one or more computing apparatuses, and may be considered to be a server system. The service entity computing system 108 as shown includes program elements 109 enabling the service entity 108 to manage a user interface that is provided to the user entity computing unit 103 (and/or any other of the user entity computing units), such that the user at the user entity computing unit 103 can obtain a certificate from a certain vehicle routing and permitting service over the network 106.

FIG. 3 also shows a block diagram depicting a schematic diagram of the service entity computing system 108. As depicted, the service entity computing system 108 comprises a processor 125, such as a CPU, a memory 127 and a network I/O 126 (input/output) for connection to the network 106 (shown in FIG. 1). The network I/O 126 is preferably implemented as a permanent network connection, although dial up connections may be suitable in certain embodiments. For example, if the service entity computing system 108 interacts with the user entity computing units 103, 104 and 105 via e-mail, then a dial-up connection may be suitable.

Like the user entity computing unit 103, the service entity computing system 108 may have a permanent or non-permanent network connection to the network 106. For purposes of discussion only, a permanent connection will be assumed as an example. The service entity computing system 108 may have a processor 125 configured to execute computer-executable software program instructions 109, in addition to a software operating system 128 stored in a memory 127 (or other computer-readable storage medium) for performing various functions. The memory 127 may store a data portion 110 including a user entity account database 111, a system route template database 112, and/or a user entity transaction database 113. It will be readily appreciated that the service entity computing system 108 may include additional hardware and software components and modules as desired.

The user entity account database 111 may include one or more data elements associated with and representing users in the user entity group 101. Some non-limiting examples of data elements in the user entity account database 111 include a user entity identifier, a password, a user entity address, user entity account information, user entity insurance information, and/or user entity type defining whether the user entity is a direct user entity or a third party user entity. It is within the scope of the invention for the user entity account database 111 to include information regarding vehicles belonging to specific users. As will be described further herein, the user entity account database 111 may be accessed by the service entity computing system 108 in response to a user entity logging on to the service entity computing system 108, such as via a website controlled by or otherwise associated with the service entity computing system 108, or responsive to specific user entity profile information being needed. An illustrative content and structure of the user entity account database 111 is shown below in Table 1.

TABLE 1

| User Entity Identifier | Password | User Entity Address | User Entity Insurance | User Entity Type | User Entity Payment Method |
|---|---|---|---|---|---|
| User Entity 1 | test123 | 123 A Street | RST Insurance Co | Direct User | Credit Card |
| User Entity 2 | password | 456 B Street | UVW Insurance Co. | Third Party User | Monthly Billing |
| User Entity 3 | 12345 | 789 C Street | XYZ Insurance Co. | Direct User | Electronic Debit |

A route template database 112 may also be stored that includes data elements associated with roadway routes from an origin to a destination. Each route may be stored in a route template that is described by a respective origin and destination, a single route (or set of routes) from the origin to the destination, the distance of each of the routes, and vehicle criteria limits associated with each of the routes. A route defines a roadway, or an ordered series of roadways, that extend from an origin to a destination. For example, a route between City A and City B may be a single highway, or may be Highway A, then Highway B, then Highway C, in that order. The route template database 112 may be pre-populated with a plurality of complete routes between combinations of origins and destinations. Of course, any given location may be considered an origin or a destination, depending upon whether a given route is directed into the location or emanating from the location.

Examples of vehicle criteria limits for a given route are maximum allowable vehicle weight (e.g., gross weight, single-axle weight, and/or axle group weight), maximum allowable vehicle size (e.g., height, width, and/or length), maximum allowable overhang (e.g., front overhang and/or rear overhang), and minimum axle spacing, as required by law or other requirement in order to traverse the given route. In general a vehicle criterion limit is a maximum, minimum, or allowable range of a physical characteristic of a vehicle. Each route template may further include information indicating the number of bridges traversed, the distance of low weight route segments, and/or the distance of high weight route segments, for each route of the route template. Still further information that may be included in the route template is route availability coding that can serve to indicate whether the route may be traversed by all users, a limited group of users or type of user, or to allow the temporary or permanent suspension of travel on the route. Service entity comments regarding the route may also be stored in the route template.

A user interface may be provided for maintenance of the system route template database 112 through the service entity computing system 108 and vehicle routing and permitting system application 109. This interface may be restricted to access by trusted users, such as service entity employees or contractors, and may provide for the maintenance of records individually and in aggregate within the system route template database 112. Maintenance functions may, e.g., include addition of routes and/or vehicle criterion limits information, and changes to routes and/or vehicle criterion limits, including flagging routes to temporary inactive status and permanent deletion of routes. Service entity comments regarding the route may also be stored in the route template. An interface may further be provided for the maintenance of the user entity account database 111 through the service entity computing system 108 and vehicle routing and permitting system application 109. This interface may similarly be restricted to access by trusted users, and provides for the maintenance of user account information. Maintenance functions may include, e.g., addition of user accounts, temporary or permanent suspension of user accounts, and user account modifications such as password reset.

Tables 2A, 2B and 2C show illustrative components of a short embodiment of the route template database 112 containing information within the boundary of a single state from an origin to a destination. The origins and destinations are described in this example as cities and/or state boundaries, however the origins and destinations may be defined in other ways, such as but not limited to GPS coordinates, landmarks, and other forms of location identification information and/or contain data from route segment to route segment. Moreover, routes may be limited to a single jurisdiction (e.g., a single county or state) or may pass through multiple jurisdictions (e.g., across state lines).

TABLE 2A

| Route Template Identifier | Origin | Destination | Complete Route and/or Route Segment | Maximum Gross Weight (lbs) | Maximum Single Axle Weight (lbs) | Maximum Axle Group Weight (lbs) | Minimum Axle Spacing (Feet) |
|---|---|---|---|---|---|---|---|
| 000001 | Alabama (border) | Amory, MS | 278 25 | 96000 | 34000 | 40000 | 7.0 |
| 000002 | Alabama (border) | Arkansas (border) | 78 9 76 6 I-55 4 3 4 61 49 | 90000 | 34000 | 40000 | 7.0 |
| 000003 | Jackson, MS | Tennessee (border) | 49 I-20 I-220 I-55 | 169000 | 34000 | 40000 | 7.0 |
| 000004 | Long Beach, MS | Louisiana (border) | I-10 | 121000 | 34000 | 40000 | 7.0 |
| 000005 | Ruleville, MS | Jackson, MS | 49W 12 49E 16 I-55 I-220 | 120000 | 34000 | 40000 | 7.0 |

TABLE 2B

| Route Template Identifier | Maximum Height (feet) | Maximum Width (Feet) | Maximum Length (Feet) | Maximum Front Overhang (Feet) | Maximum Rear Overhang (Feet) |
|---|---|---|---|---|---|
| 000001 | 13.5 | 12.5 | 75.0 | 7.0 | 10.0 |
| 000002 | 13.5 | 12.0 | 75.0 | 7.0 | 10.0 |
| 000003 | 15.0 | 12.5 | 105.0 | 7.0 | 10.0 |
| 000004 | 14.0 | 12.0 | 87.0 | 7.0 | 10.0 |
| 000005 | 14.25 | 10.6 | 75.0 | 7.0 | 10.0 |

TABLE 2C

| Route Template Identifier | Bridges Traversed | Low Weight Road Distance (miles) | High Weight Road Distance (miles) | Total Distance (miles) | Route Availability | Route Comments |
|---|---|---|---|---|---|---|
| 000001 | 2 | 10.0 | 15.0 | 25.0 | Route Suspended | Temporarily Suspended on Aug. 4, 2004 due to construction at xyz location |
| 000002 | 7 | 23.5 | 155.5 | 178 | Route Available (all users) | |
| 000003 | 3 | 0.0 | 206.0 | 206.0 | Route Available (all users) | |
| 000004 | 4 | 0.0 | 43.0 | 43.0 | Route Available (limited users) | |
| 000005 | 8 | 34.0 | 101.0 | 135.0 | Route Available (all users) | |

The service entity computing system may further include a user entity transaction database 113 that may include aggregate transaction information that may associate a registered user in the user entity account database 111 with a specific route or routes from the route template database 112. Additional information that may be stored in the user entity account database 111 is shown by way of example in Tables 3A, 3B and 3C. Such information may include, but is not limited to, permit type, vehicle criteria, vehicle registration information such as tag, state of registration and/or vehicle identification information, load information, intended travel date and time and any related travel restrictions based on the permit type, and/or vehicle criteria for the vehicle associated with the respective user. Fees computed for the transaction may also be stored in this database for service entity billing purposes.

TABLE 3A

| Transaction Identifier | User Entity Identifier | Permit Recipient Identifier | Route Template Identifier | Permit Type | Vehicle Gross Weight (lbs) | Vehicle Single Axle Weight (lbs) | Vehicle Axle Group Weight (lbs) | Vehicle Axle Spacing (Feet) |
|---|---|---|---|---|---|---|---|---|
| W90000 | User Entity 1 | User Entity 1 | 000002 | Legal Trip | 91000 | 33000 | 36000 | 7.0 |
| W90001 | User Entity 2 | User Entity 1 | 000005 | Oversize | 80000 | 32000 | 37000 | 7.0 |
| W90002 | User Entity 3 | User Entity 3 | 000004 | Oversize and Overweight | 115000 | 33000 | 36000 | 8.0 |

TABLE 3B

| Transaction Identifier | Vehicle Height (feet) | Vehicle Width (feet) | Vehicle Length (feet) | Vehicle Front Overhang (feet) | Vehicle Rear Overhang (feet) |
|---|---|---|---|---|---|
| W90000 | 13.0 | 8.0 | 55.0 | 0 | 0 |
| W90001 | 14.0 | 9.0 | 75.0 | 0 | 0 |
| W90002 | 13.9 | 8.9 | 74.5 | 0 | 0 |

TABLE 3C

| Transaction Identifier | Travel Date/Time | Vehicle Make | Vehicle Tag/VIN | Load Description | Oversize Fees | Overweight Fees | Legal Fees | Total Fees |
|---|---|---|---|---|---|---|---|---|
| W90000 | Aug. 04, 2004 | PB | ABC123 | Equipment | 0.00 | 0.00 | $25.00 | $ 25.00 |
| W90001 | Aug. 06, 2004 | IH | DEF456 | Turbine | $10.00 | 0.00 | 0.00 | $ 10.00 |
| W90002 | Aug. 04, 2004 | MK | GHI789 | Trusses | $10.00 | $197.50 | 0.00 | $207.50 |

An illustrative use of each of these databases will be described in greater detail later in the specification. It is to be expressly understood that other formats for each of the above noted databases are possible without detracting from the spirit of the invention. It should also be expressly understood that other units of measure and/or data fields including additional data elements may be included and omitted without detracting from the spirit of the invention.

Figure 2:
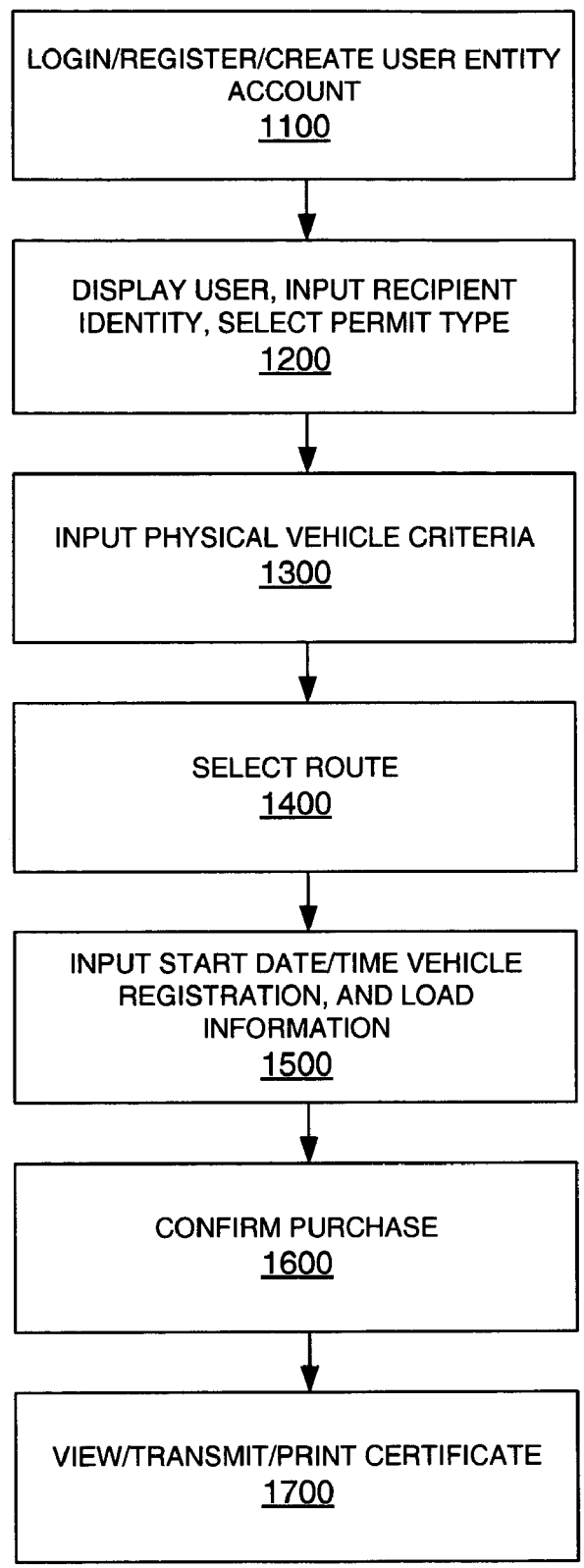
FIG. 2 is a flow diagram showing illustrative steps that may be performed when a user interacts with the vehicle routing and permitting system of FIG. 1, in accordance with at least one aspect of the present invention.

An illustrative interaction between the user entity group 101 and the service entity 102 is described in relation to the vehicle routing and permitting system 100 according to an example of implementation of the present invention. With reference to FIG. 2, at step 1100 a user at the user entity group 101 accesses a secure website (for example) of the service entity 102 by either entering a predetermined user identification and password, or by registering as a new user. Once the identity of the user has been verified by the service entity computing system 108, the user is granted access to the vehicle routing and permitting system application 109 of the service entity 102. The user may preview the available routes in the system route template database 112 if desired before registering and/or logging in. The user may interact with the service entity computing system 108 via a user input device at the user entity computing unit 103, such as but not limited to a keyboard, a pointing device, a touch-sensitive pointing surface, a speech recognition unit.

At step 1200, the user is presented with a user interface on a display device of the user entity computing device 103. The user interface may be a graphical user interface or other type of user interface. For a "direct" type user classification, where the recipient and billing information describe the same user, the user interface may display the user's name, address, insurance information, and/or billing information. For a third-party user, where the recipient and billing entities are distinct and different, the user interface may present the user the opportunity to select the recipient entity. In any event, the user is then prompted to select a permit type. In a non-limiting example, permit types may include legal, oversize, overweight, oversize and overweight, mobile home oversize, and trip. A trip permit may be added to any of the above permit types. Other permit types may be added or substituted in accordance with the spirit of this invention.

At step 1300, the user interface, the presentation of which may vary based on permit type selected in step 1200, may allow the user to input vehicle criteria. For example, the user may input the height, width, weight, rear overhang, front overhang, and/or axle information. In general, a vehicle criterion is a physical characteristic of the vehicle. This may be done by providing the user with a set of user-modifiable data fields. Once the above-described information is provided, the user entity submits this information to the service entity 102 via network 106.

At step 1400, the user interface presents the user with a screen that contains a list of route origins. The origins included in the displayed list may depend upon the physical vehicle criteria entered by the user in step 1300. From this screen, the user may select a preferred origin. In response, the routing application 109 searches for only those destinations that are traversable from the origin based on the physical vehicle criteria entered in step 1300. The found subset of destinations are displayed as a list by the user interface. From this screen, the user entity may select a preferred one of the listed destinations. In response, routing application 109 searches for those routes that are traversable from the selected origin to the selected destination based on the physical vehicle criteria entered in step

1300. The user interface then displays to the user the found routes as a list of routes. At this point, the user may select a preferred one of the listed routes. In this non-limiting example, these origins, destinations, and routes are displayed in a tabular list format, however these items may be displayed in any other format, and may be displayed graphically (e.g., in a map format) including such information as waypoint coordinates.

At step 1500, the user interface confirms the user-selected origin, destination and route and accompanying fees for such travel. In this non-limiting example, the user may be required to input a start date and time, vehicle make, vehicle registration, and load description information for the vehicle for which a permit is being ultimately requested. Once the above-described information is provided, the user may confirm the purchase by submitting this information to the service entity 102 via network 106 (e.g., by selecting a displayed "submit" or "okay" button).

At step 1600, the user interface confirms the user's intent to purchase a permit. The permit may be assigned a unique transaction identifier and a retrievable and transmittable link, e.g., a universal resource locator (URL) link, to a permit confirmation certificate. At step 1700, the user retrieves the permit certificate by selecting the link provided in step 1600. This certificate may be viewed, printed, or transmitted to another user, or stored for later retrieval.

At this point, the transaction process may be considered to be complete, and the user may terminate the session, or repeat or modify the process to purchase another permit certificate. Each of the above mentioned steps will be described below with reference to various illustrative screen shots of the user interface.

Login or Register/Create a User Entity Profile (Step 1100)

To access the vehicle routing and permitting system 100, the user may invoke the browser 124 and enter the service entity's 102 specific network address or domain name server (DNS) name. It should be expressly understood that the user might be a user of any of the user entity computing unit 103–105 within the user entity group 101 that accesses the vehicle routing and permitting system 100. The user at user entity computing unit 103 will be considered the user for purposes of this example. Also, it will be assumed for purposes of this example that the user accesses the service entity 102 via a web page using the browser 124. However, the user may access the service entity 102 in any of a number of ways. Responsive to the user selecting the service entity's 102 network address or DNS name, the browser 124 displays a web page on a display device of the user entity computing unit 103.

Figure 2A:
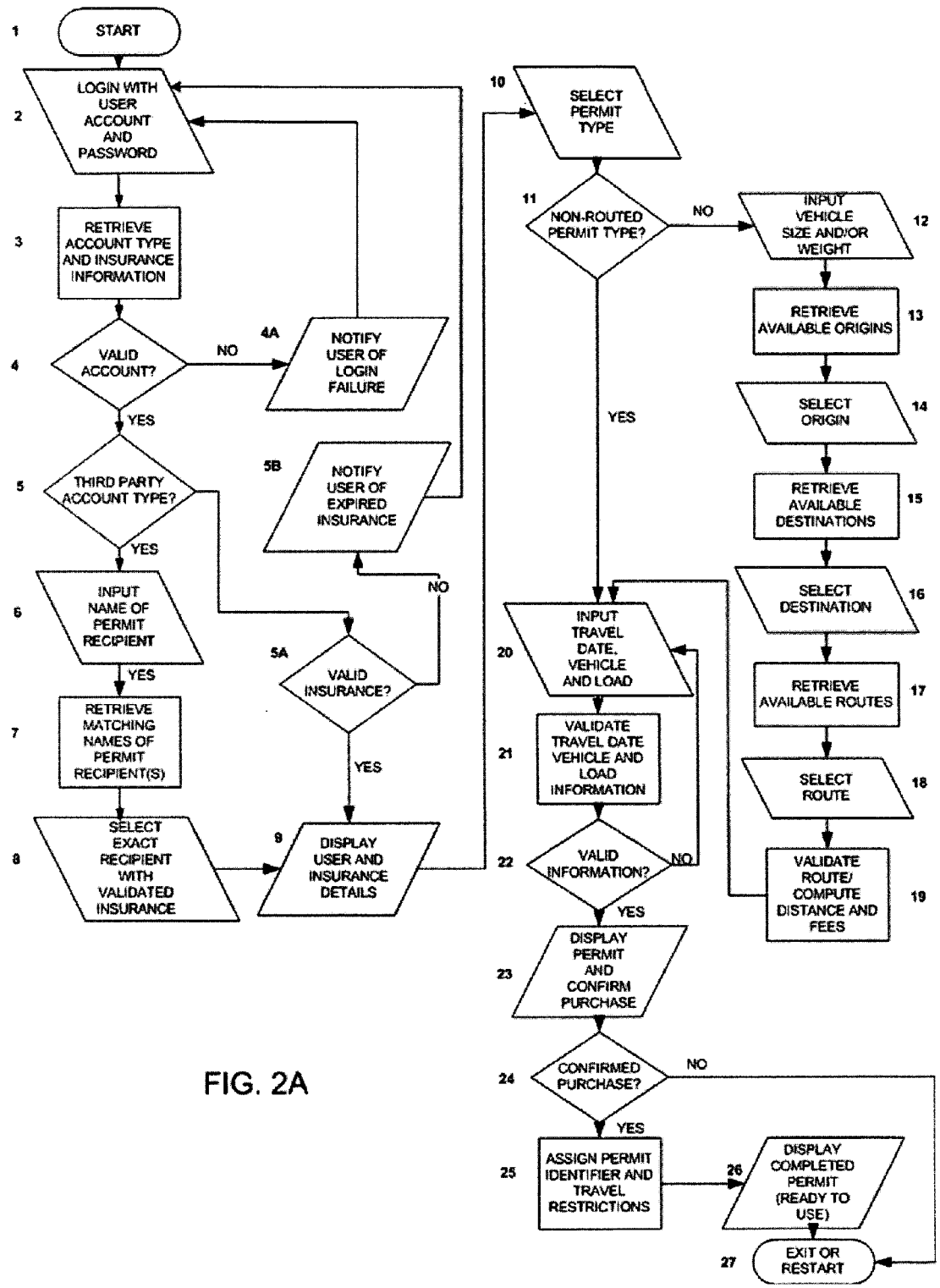
FIG. 2A is a flow diagram showing illustrative steps that may be performed for providing routing and fee calculation to user entities based on route and physical vehicle criteria in accordance with at least one aspect of the present invention.
Figure 5:
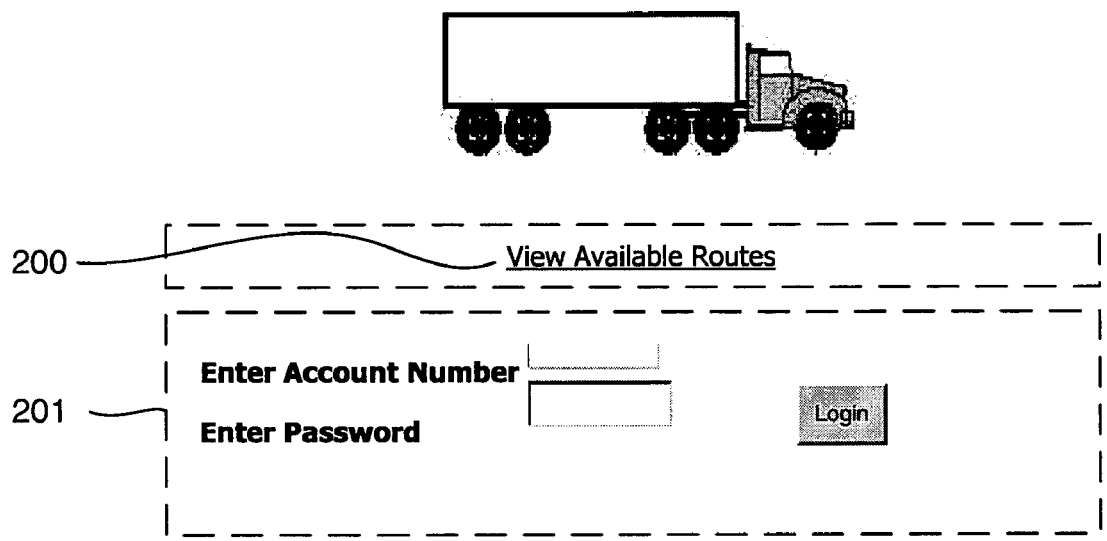

Referring now to FIG. 2A, the user is first presented with a login/registration web page at step 2. A non-limiting example of a login/registration web page as shown in FIG. 5. Prior to being able to access the vehicle routing and permitting system 100, the user may either log into the service entity's login/registration page by entering a user identification and password, or alternatively register as a new user of vehicle routing and permitting services. If the user is a registered user, meaning that the user has previously registered and has been approved by the service entity 102, then the user may simply provide the service entity 102 with a user identification and an associated password each time the user desires to access the vehicle routing and permitting system 100. As can be seen in FIG. 5, a registered user enters the user identification and associated password into user-modifiable data fields 201, and then clicks a Login button to cause the entered information to be submitted to the service entity 102. It is this login information that allows the service entity 102 to access the user account and registration information profile in the user entity account database 111.

When a registered user enters user identification and a password, the service entity 102 receives this login information and processes it with respect to the user entity account database 111. For example, the processor 125 may access the user entity account database 111 to locate the entry corresponding to the user identification. If no corresponding entry is found in the user entity account database 111, an error message is returned to the user. If a corresponding entry is found, the password in the entry in the user entity account database 111 is compared to the password provided in the login information. If a match is not found, an error message is returned to the user. If a match is found, the user is successfully identified and is granted access to the vehicle routing and permitting system 100.

However, if the user accessing the login/registration webpage is not registered, the user may contact the service entity 102, which may require written signatures and/or waivers related to the use of the system and be effected through the completion of a form that is transmitted to the user by mail, fax or other suitable transmission method. The service entity 102 assigns the user identification and a temporary password that the user can change after log in. The service entity also retains the right to suspend or revoke account privileges for any given user.

As a variant, and providing it meets the requirements of any applicable laws and the operating intentions of the service entity, it is possible that the registration between the user and the service entity 102 may be effected entirely through automated means contained within a module related to the login/registration web page. These methods will be readily apparent to the reader skilled in the art.

Assuming that the application for registration is granted and initiated by the service entity 102, at step 3 the user entity account information is retrieved, and at step 4 this information is checked for validity. The user entity account database 111 includes information pertaining to the user entity registered with the service entity 102. For each user, an entry may be provided, including various information describing and/or otherwise associated with the user. Each entry may include an entity identifier and/or a corresponding password. Each user entity identifier may be associated with a respective user entity profile, including user entity characteristics that may be used by software at the service entity 102 to alter the identities of the billing contact and the certificate recipient. As a variant, the act of a single logon using a user identifier and password may not be required for the user to access the vehicle routing and permitting system 100. In this variant, a trusted user (e.g., an employee or other trusted entity of the service entity 102) may access multiple user entity profiles and fully interact with the vehicle routing and permitting system 100.

Display User Identity, Input Recipient Identity, Input Permit Type (Step 1200)

Figure 6:
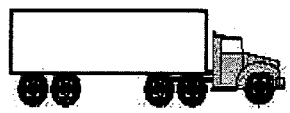

Once the user has been successfully identified by the login process, a non-third party or direct registered user profile of the user entity computing unit 103 may download a module displaying the billing and registration information of the direct user permit recipient. In this example, an illustrative user interface screen corresponding to a direct user entity profile is shown in FIG. 6, which corresponds to step 9 in FIG. 2A. In the event that that the user has a third party profile, the computing unit 103 downloads a module displaying a search or edit function to locate or input (step 6) a registered user entity that is retrieved from the user entity account database 111 (step 7), who is intended to be the permit recipient.

Referring to FIG. 6, user entity billing information 301 and certificate recipient information 300 is retrieved is displayed for the user, and in step 10 the user is prompted to select a permit type using input field 302, which may be implemented as a drop-down list. Permit types may include, but are not limited to, legal, oversize, overweight, oversize and overweight, mobile home oversize, and trip. Trip permit may be added to any of the above permit types. This list is but an example of one implementation, and other permit types may be added or substituted in accord with the broad aspects of this invention. Responsive to the permit type being selected by the user, the selected permit type is submitted to the service entity computing system 108.

Input Physical Vehicle Criteria (Step 1300)

One the user has selected the permit type and submitted it to the service entity computing system 108, the service entity computing system 108 and the routing application 109 processes the permit type selection and generates a user interface screen, such as the screen shown in FIG. 7, that includes the selected permit type. The user interface screen may further include one or more editable fields that are specific to the permit type selected. The user interface screen may further include various fields 402, 403 that the user may populate with information. Such fields may include editable fields 402 for vehicle height, width, length, front overhang, rear overhang, as well as editable fields 403 requesting gross weight, axle group 1 weight, axle group 2 weight, axle group 3 weight, axle group 4 weight. Portions of this editable information or additional editable information may be displayed in other variations of this illustrative implementation. Additionally, although the present example displays editable information in commonly used English measurements of feet, inches and pounds, the system may alternately display and accept information according to metric standards or in other units of measurement.

Once the requested information is input by the user, the user may select a displayed "Find Available Routes" button 404 function, to submit the information to the service entity computing system 108. In response, the routing application 109 checks the information for completeness and validity (step 22 of FIG. 2A), and if the data is incomplete or if any element is outside of the global parameters that may be defined, the service entity computing system 108 and the routing application 109 return the user to the input physical vehicle criteria screen (step 12) in FIG. 7 and redisplays the editable information input by the user entity with error indicators specifying the discrepancy. However, if the information entered by the user is valid and all elements are within the global parameters, the service entity computing system 108 and the routing application 109 processes the information against the system route template database 112. In an alternate example, some permit types may not require routing, i.e. depending upon the permit selected, the vehicle may be allowed to traverse any route without specific routing. In this case, the user would be directed to a user interface screen such as that shown in FIG. 11 (steps 20 and 1500).

Select Route (Step 1400)

If the information input in step 1300 is valid, a permit type requiring routing is selected by the user, and all information is within optional global parameters, then the service entity computing system 108 and the routing application 109 processes the information against the system route template database 112. To perform such processing, the service entity computing system 108 and the routing application 109 execute a data query (step 13) to determine a subset of all available routes that would allow a vehicle having the user input vehicle physical criteria, (e.g., the dimensions and weights of the vehicle). For example, the vehicle criteria limits of each route are compared with the user input vehicle physical criteria, and those routes that have vehicle criteria limits that encompass the vehicle criteria are determined. A vehicle criterion limit "encompasses" a user-specified vehicle criterion if a vehicle having the vehicle criterion would be allowable on the associated route. For example, where a route has a vehicle criterion limit that defines a maximum vehicle weight of X pounds, that vehicle criterion would be compatible with any vehicle weight of X pounds or less, but not of any vehicle weight of greater than X pounds.

Once this subset of routes is determined, a set of all of the origins defined by those routes may also be determined and displayed to the user (step 13), such as shown in FIG. 8, item 504. Duplicate origins may be removed from the list of found origins 504, and the origins may be presented in any order such as alphabetically. The system can alternatively be configured to display all existing origins, whether routes emanating from the origins can handle the user input physical vehicle criteria or not, but with only the traversable routes being able to be selected by the user entity.

Responsive to the user selecting one of the origins from the list 504 (step 14), a second data query is executed in step 15 on the system route template database 112, which finds all available destinations traversable from the selected origin with routes that have vehicle criteria limits that encompass all of the user-specified physical vehicle criteria. Duplicate destinations may be removed and the user may be presented with the displayed identity of the previously selected origin 601 as well as a list 603 of the destinations determined in step 15. The list of destinations may be presented in any order, such as alphabetical, and may be viewed by the user via a drop-down control 602.

The user then selects one of the destinations in the displayed list 603. In response, a third data query is executed in step 17. The third data query searches the system route template database 112 (e.g., using a database query) for all qualifying routes between the user-selected origin and the user-selected destination in order of total route distance. A qualifying route is a route in which its vehicle criteria limits encompass all of the user-specified physical vehicle criteria. A user interface screen such as that shown in FIG. 10 is then presented to the user. The screen of FIG. 10 shows the selected origin, the newly-selected destination 701, and a list 703 of the routes found in the third data query search of step 17. The user then selects one of the routes shown in the list 703 (step 18) of routes. The list 703 may be in the form of a drop-down list 702. The routes may be displayed in the list 702 in any order, such as in ascending order by total route distance, or by frequency of use.

During interaction with any of the user interface screens described herein, the user has the ability to step backward and modify the user's choices for any of the information that the user has provided. The new information would then be reprocessed, and alternative responses would be displayed. It should be readily apparent to the reader skilled in the art that different origins, destinations, and routes will be shown in the various user interface screens described herein, depending upon the user's input of physical vehicle criteria.

Figure 4:
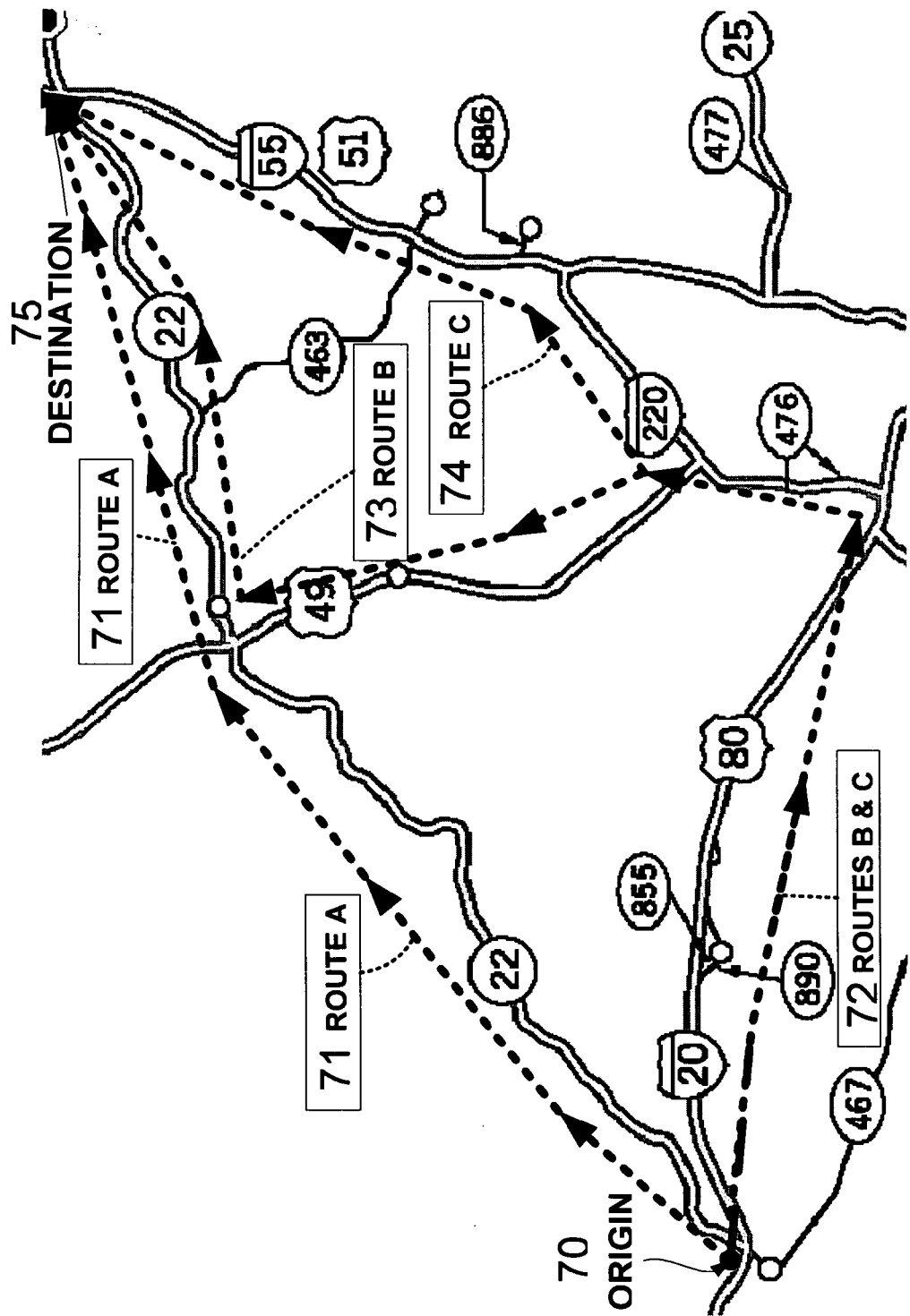
FIG. 4 is an illustrative map detailing several routes between an origin and a destination with varying restrictions and distances, in accordance with at least one aspect of the present invention.

Referring now to FIG. 4, an illustrative map is shown containing an origin and a destination with three routes between them: Route A, Route B, and Route C. This map is shown merely for illustrative purposes and is not necessarily displayed to the user. However, such a map may be displayed to the user if desired. Each of these routes A, B, and C in this example is associated with one or more respective vehicle criteria limits. For example, Route A may have an associated vehicle criteria limit that defines a maximum allowable vehicle height of 14.0 feet for that route. Route A may additionally have an associated vehicle criteria limit that defines a particular maximum allowable vehicle width. Route B may have an associated vehicle criteria limit that defines a maximum allowable vehicle height of 15.0 feet for that route. Route C may have an associated vehicle criteria limit that defines a maximum allowable vehicle height of 16.0 feet for that route. Assume that Route A is 50 miles in length, that Route B is 100 miles in length, and that Route C is 150 miles in length. The shortest route (Route A) may be preferable to the user, but if the user is attempting to route a vehicle from the specified origin to the specified destination in this example that is 14.5 feet in height, Route A would not be provided to the user as an option. This is because the vehicle criteria limits of Route A are not compatible with the user-specified vehicle criterion of 14.5 foot in height. Instead, Routes B and C, which do have compatible vehicle criteria limits, would be provided to the user to choose from. In this example, the user would likely choose Route B because it would be the shortest available route. On the other hand, if the user is routing a vehicle from the specified origin to the specified destination in this example that exceeds 15.0 feet in height, but does not exceed 16.0 feet in height, Route C would be the only available route. If the user is routing a vehicle that exceeds 16.0 feet in height from the specified origin to the specified destination in this example, there does not exist a traversable route, and so no routes are displayed. In fact, the particular origin itself may also not be displayed as a selectable origin to the user since there would be no traversable routes emanating from the origin in accordance with the user-specified vehicle criterion.

Input Start Date/Time Vehicle Registration and Load Information (Step 1500)

In step 19, the service entity 102 may automatically calculate fees based on the user route selection, the total distance of the selected route, the user-specified vehicle criteria, and/or other information associated with the selected route. Referring to the illustrative user interface screen of FIG. 11, in step 20, the user is presented with an itemized set of costs 805, 806, 807, 808, 809 cost of each fee type as well as being required to complete the remaining information of intended travel date 802 and vehicle identification information 803, such as but not limited to vehicle make, vehicle tag, tag state, and/or load description. Additionally, travel restriction information 804 based on physical vehicle criteria and route envelope information is displayed.

In step 21, the information input by the user is validated by the service entity 102, and if the information is determined to be valid at step 22, then a preview of an electronic permit is displayed and the user is asked whether the user wishes to purchase the permit. However, if the information is determined to be invalid in step 22, the user is returned to step 20, where the previous user input information is redisplayed with an opportunity to edit the information. Also, error indicators are displayed specifying the discrepancy or discrepancies in the user input information.

Confirm Purchase (Step 1600)

For security reasons, the user may be given a time limit (e.g., 60 minutes) to complete a permit from start to finish, after which the permit session will be invalidated and the user entity must begin from step 2. However, assuming that the user has correctly completed the permit application form and selects a purchase button 810 within the time limit, the user input information is validated, the transaction is recorded to the user entity transaction database 113, and a unique permit identifier is generated in step 25.

View/Transmit/Print Certificate (Step 1700)

Figure 12:
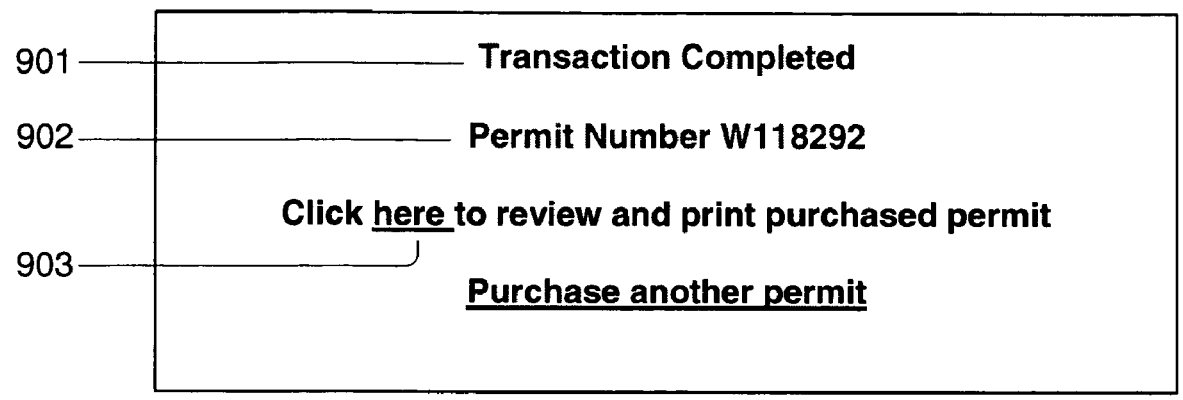

The service entity computing system 108 then displays a confirmation form, such as that shown in FIG. 12, to the user. The completed transaction is confirmed 901 to the user, the unique permit identifier 902 is displayed, and the user is given an option 903 to view, transmit, print, or later recall the completed permit certificate in step 26. FIG. 13 shows an illustrative electronic permit 1001 and unique permit identifier 1002, as displayed to the user. The user may also print out the permit onto physical paper, since a physical printout of the permit document typically must accompany the travel of the vehicle.

It should be readily apparent to the reader skilled in the art that this illustrative purchasing process is entirely automated at the service entity 102. However, in variations of this implementation, the service entity 102 may choose an implementation that requires a manual review by a service entity authorized employee or agent of the information submitted before permission to travel is granted. For example, a permit request may be marked for review and handling by a human, and may be placed in a queue for such purposes.

CONCLUSION

Thus, a convenient and efficient system has been devised for allowing a user to determine appropriate routes based on vehicle criteria and to electronically apply for a permit to travel those routes. It should be noted that reference numerals in the appended method claims identifying steps are for convenience only and are not intended to imply a necessary ordering of the steps. It is, therefore, to be understood that within the scope of the appended claims the invention may be practiced otherwise than as specifically described. No claim element should be interpreted to be in means-plus-function format unless the entire phrase "means for" is explicitly recited in the claim element.

What is claimed is:

1. A method in a computing system for routing using a plurality of stored route entries that each define a route over which a vehicle may travel, and that each have an associated vehicle criterion limit, comprising steps of:
 receiving an indication of an origin and a destination;
 receiving a vehicle criterion;
 searching the plurality of route entries for at least one route that connects the origin with the destination and that is associated with a vehicle criterion limit that encompasses the vehicle criterion; and displaying results from the step of searching.

2. The method of claim 1, wherein the route entries each further have an associated frequency of use of the respective route, and wherein the step of displaying includes displaying the results in an order that depends upon a frequency of use of routes found in the results.

3. The method of claim 1, wherein the route entries each further have an associated frequency of use of the respective route, and wherein the step of displaying includes displaying only those routes that have at least a minimum frequency of use.

4. The method of claim 1, wherein the vehicle criterion limit is at least one of maximum vehicle height, maximum vehicle width, and maximum vehicle length.

5. The method of claim 1, wherein the vehicle criterion limit is at least one of maximum vehicle front overhang and maximum vehicle rear overhang.

6. The method of claim 1, wherein the vehicle criterion limit is maximum vehicle weight.

7. The method of claim 1, wherein the step of receiving the indication of the origin and the destination includes receiving the indication remotely over a network.

8. The method of claim 1, wherein the vehicle criterion is one of vehicle height, vehicle width, and vehicle length.

9. The method of claim 1, wherein the vehicle criterion is vehicle weight.

10. The method of claim 1, wherein the vehicle criterion is one of vehicle front overhang and vehicle rear overhang.

11. A method in a computing system for determining vehicle routing, comprising steps of:
    (1) receiving data representing a vehicle criterion;
    (2) accessing a plurality of stored routes, each route having an associated origin and destination;
    (3) searching the plurality of stored routes for at least one of the origins based on the vehicle criterion; and
    (4) causing to be displayed the at least one origin found in step (3).

12. The method of claim 11, wherein each of the stored routes further has an associated vehicle criterion limit, and wherein step (3) includes searching for at least one of the origins defined by a route whose associated vehicle criterion limit encompasses the vehicle criterion, and selecting the at least one origin found in step (3).

13. The method of claim 11, further including steps of:
    (5) receiving data indicating one of the origins caused to be displayed in step (4);
    (6) searching the plurality of stored routes for at least one of the destinations based on the vehicle criterion and the origin indicated in step (5); and
    (7) causing to be displayed the at least one destination found in step (6).

14. The method of claim 13, further including steps of:
    (8) receiving data indicating one of the destinations caused to be displayed in step (7);
    (9) searching the plurality of stored routes for at least one of the routes that connects the origin indicated in step (5) and the destination indicated in step (8); and
    (10) causing to be displayed the at least one route found in step (9).

15. The method of claim 11, wherein step (1) includes receiving the data remotely over a network, and wherein step (4) includes transmitting data to the network representing the at least one origin found in step (3).

16. The method of claim 14, further including a step of automatically generating an electronic version of a permit based on the vehicle criterion, the origin indicated in step (5), and the destination indicated in step (8).

17. A computer-displayed user interface for providing routing information, comprising:
    a user-interactive first portion for receiving an indication of a vehicle criterion;
    a user-interactive second portion for receiving an indication of an origin;
    a third portion for indicating at least one route depending upon the origin and the vehicle criterion;
    a user-interactive fourth portion for receiving an indication of a destination after the third portion indication the at least one route; and
    a user-interactive fifth portion for indicating at least one route depending upon the origin, the vehicle criterion, and the destination.

18. The user interface of claim 17, wherein the second portion includes an indication of a set of origins that depend upon the vehicle criterion and that are user-selectable.

19. The user interface of claim 17, wherein the fourth portion includes an indication of a set of destinations that depend upon the vehicle criterion and the origin and that are user-selectable.

20. The user interface of claim 17, wherein the fifth portion includes an indication of a set of routes that depend upon the vehicle criterion, the origin, the destination, and a frequency of use of each of the routes, the set of routes being user-selectable.

21. The user interface of claim 17, wherein the first portion and the second portion are displayed on a same user interface screen simultaneously.

* * * * *